(12) United States Patent
Helfrich et al.

(10) Patent No.: US 12,172,848 B2
(45) Date of Patent: Dec. 24, 2024

(54) SYSTEM AND METHOD FOR ASSEMBLING LAYERS OF PACKAGING MEANS AND FOR FORMING TRANSPORT AND STORAGE UNITS FROM AT LEAST ONE OF SAID LAYERS

(71) Applicant: KHS GMBH, Dortmund (DE)

(72) Inventors: Stefan Helfrich, Heppenheim (DE); Alexander Mann, Eckelsheim (DE); Martin Rübsaamen, Bad Dürkheim (DE)

(73) Assignee: KHS GmbH, Dortmund (DE)

( * ) Notice: Subject to any disclaimer, the term of this patent is extended or adjusted under 35 U.S.C. 154(b) by 77 days.

(21) Appl. No.: 17/928,353

(22) PCT Filed: May 18, 2021

(86) PCT No.: PCT/EP2021/063068
§ 371 (c)(1),
(2) Date: Nov. 29, 2022

(87) PCT Pub. No.: WO2021/239503
PCT Pub. Date: Dec. 2, 2021

(65) Prior Publication Data
US 2023/0211959 A1    Jul. 6, 2023

(30) Foreign Application Priority Data
May 29, 2020 (DE) ............... 10 2020 114 462.8

(51) Int. Cl.
*B65G 47/08* (2006.01)
*B65B 21/06* (2006.01)
(Continued)

(52) U.S. Cl.
CPC ............ *B65G 47/088* (2013.01); *B65B 21/06* (2013.01); *B65G 47/715* (2013.01); *B65G 57/24* (2013.01);
(Continued)

(58) Field of Classification Search
CPC ..... B65B 43/46; B65B 21/06; B65B 2220/14; B65G 17/323; B65G 47/847;
(Continued)

(56) References Cited

U.S. PATENT DOCUMENTS

| | | | |
|---|---|---|---|
| 3,219,203 A | 11/1965 | Jeremiah | |
| 3,941,236 A * | 3/1976 | Hagedorn | B65B 35/50 414/794.7 |
| 4,041,674 A * | 8/1977 | Reid | B65B 9/02 53/553 |
| 5,733,100 A * | 3/1998 | Slat | B65G 47/088 414/789.6 |

(Continued)

FOREIGN PATENT DOCUMENTS

| | | | | |
|---|---|---|---|---|
| DE | 102014206988 A1 * | 10/2015 | | B65G 57/24 |
| DE | 102018219082 A1 * | 5/2020 | | B65G 47/082 |

(Continued)

*Primary Examiner* — Gene O Crawford
*Assistant Examiner* — Muhammad Awais
(74) *Attorney, Agent, or Firm* — Laurence A. Greenberg; Werner H. Stemer; Ralph E. Locher

(57) ABSTRACT

A system for assembling layers of packages and for forming transport and storage units from the layers. A grouping station has a grouping table for arranging and grouping the packages in a predefined layer arrangement. A package delivery feeds the packages to the grouping table in a conveying direction. The package delivery has two row conveyors for transporting at least one row of packages each on either side of the grouping table. A transfer unit transfers the packages from the row conveyors to the grouping table by sliding them in a respective sliding direction over a slide-over buffer region between each row conveyor and the grouping table, in order to form the layer of packages. A layer stacker then slides the layer of packages from the grouping table over onto a plate provided in the layer (Continued)

stacker, while maintaining the layer arrangement, in order to form the transport and storage unit.

15 Claims, 4 Drawing Sheets

(51) Int. Cl.
*B65G 47/71* (2006.01)
*B65G 57/24* (2006.01)

(52) U.S. Cl.
CPC .. *B65B 2220/14* (2013.01); *B65G 2201/0244* (2013.01)

(58) Field of Classification Search
CPC .......... B65G 47/088; B65G 2201/0244; B65G 2201/0252; B65G 47/715; B65G 57/24; B65G 47/084; B67C 3/24
USPC ...................... 198/418.7, 619, 426, 429, 430
See application file for complete search history.

(56) References Cited

U.S. PATENT DOCUMENTS

| | | | | |
|---|---|---|---|---|
| 8,875,869 B1 * | 11/2014 | Burchell | ............... | B65G 57/035 |
| | | | | 198/419.3 |
| 11,377,306 B2 | 7/2022 | Senn et al. | | |
| 2010/0193327 A1 * | 8/2010 | Mougin | ............... | B65G 47/088 |
| | | | | 198/429 |
| 2016/0107782 A1 * | 4/2016 | Hutter | ..................... | B65B 43/48 |
| | | | | 53/467 |
| 2017/0107003 A1 * | 4/2017 | Duchemin | ................ | B65B 7/16 |
| 2019/0382212 A1 * | 12/2019 | Hansl | ..................... | B65G 61/00 |

FOREIGN PATENT DOCUMENTS

| | | | | | |
|---|---|---|---|---|---|
| EP | 2762428 B1 | * | 4/2017 | .......... | B65G 57/005 |
| FR | 2607481 A1 | * | 6/1988 | | |
| FR | 3074487 A1 | * | 6/2019 | .......... | B65G 47/082 |
| WO | WO-2019228863 A1 | * | 12/2019 | | |
| WO | WO-2020094318 A1 | * | 5/2020 | .......... | B65G 47/088 |

* cited by examiner

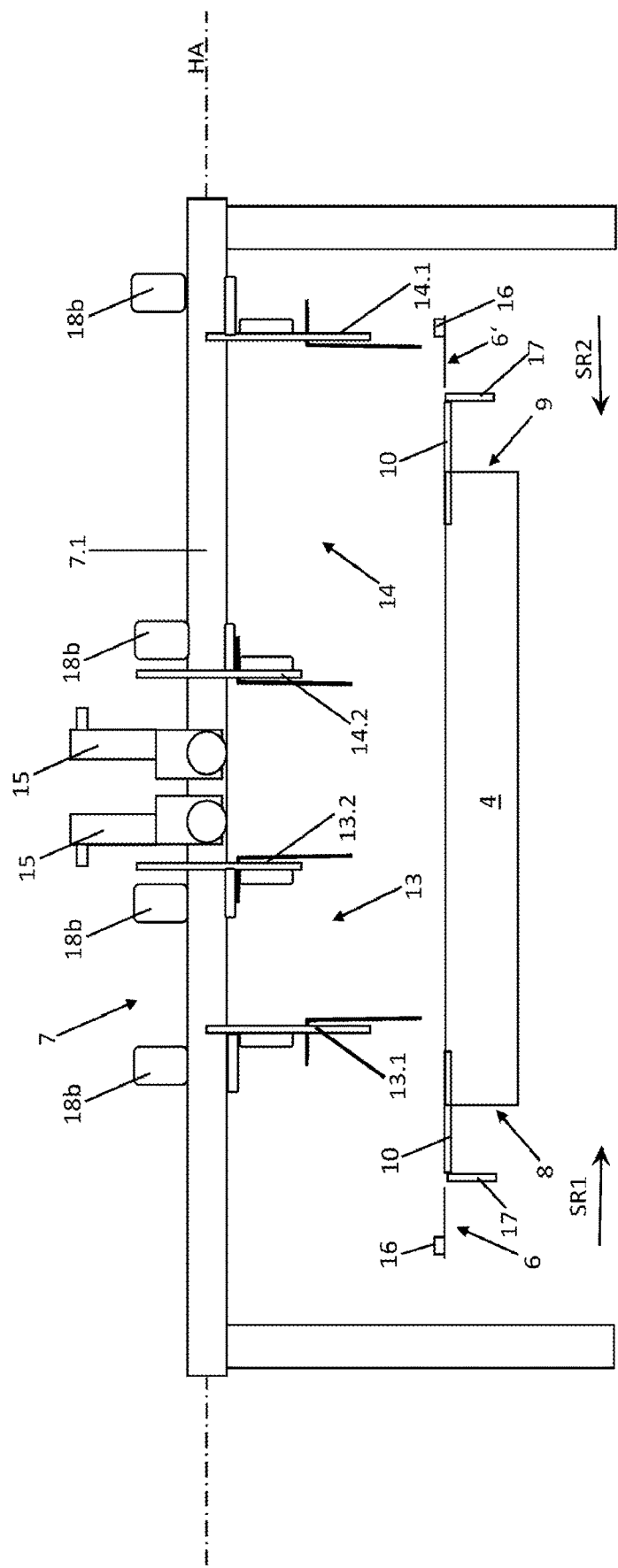

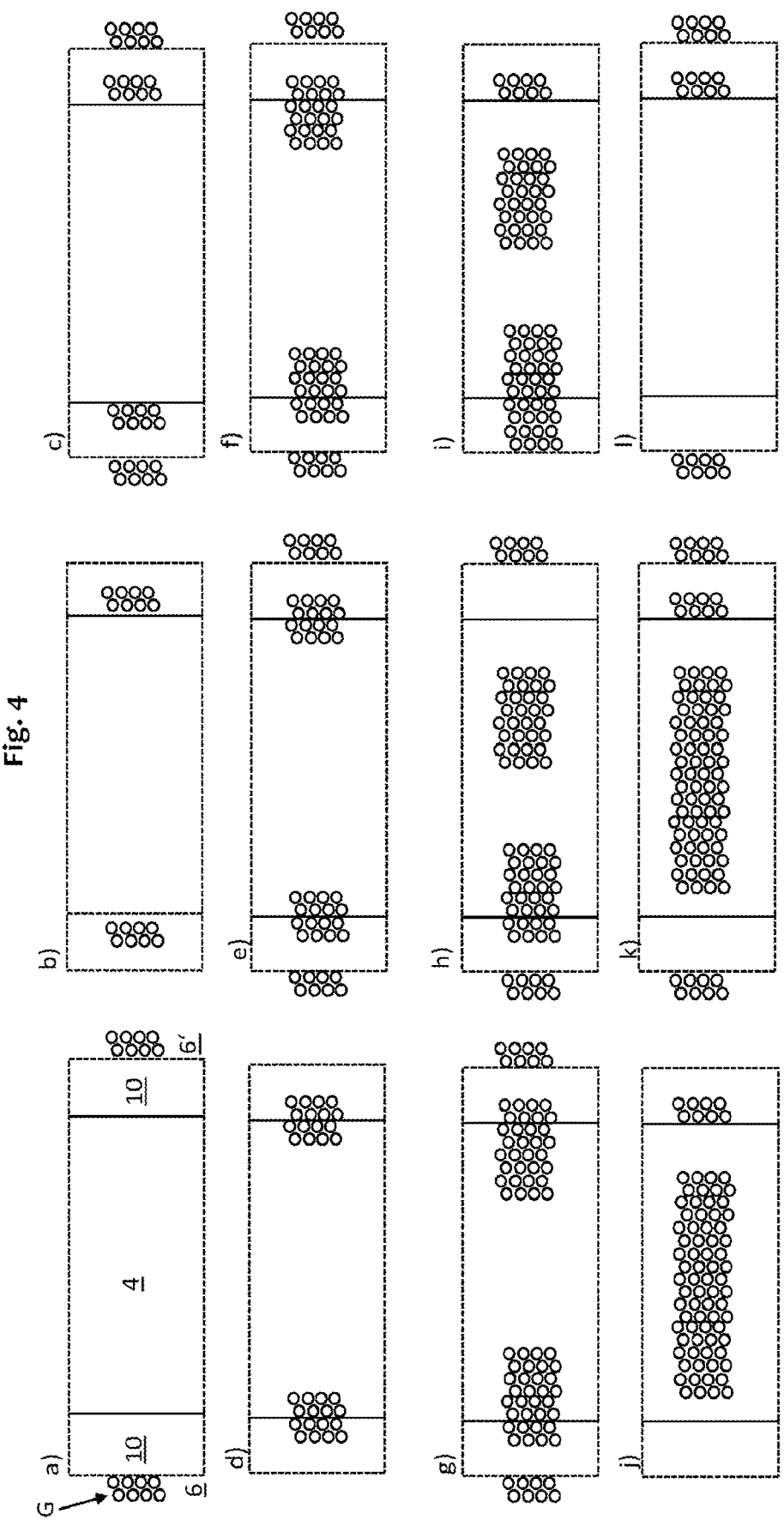

SYSTEM AND METHOD FOR ASSEMBLING LAYERS OF PACKAGING MEANS AND FOR FORMING TRANSPORT AND STORAGE UNITS FROM AT LEAST ONE OF SAID LAYERS

FIELD AND BACKGROUND OF THE INVENTION

The invention relates to a system for assembling layers of packaging means and for forming transport and storage units from at least one of these layers, and a corresponding method for assembling layers of packaging means and forming transport and storage units from at least one of these layers.

The principle is known of packing packaging means or packaging units, such as bottles, containers or packages in the form of cartons, in particular also cans etc. in outer packaging means, such as in cartons, trays, beverage boxes etc., as bundles, and bringing them into commercial circulation in this form.

In the case of beverage cans in particular, bundles of the type referred to are produced, for example, by forming individual layers of beverage cans, and stacking such layers on one another to form a layer stack, wherein such layer stacks are laid or formed on a pallet, for example, and these completed pallets then form the transport and dispatch unit. The layer formation and, if appropriate, also the stacking of the layers, usually takes place on production lines of beverage filling systems. In this situation, it is possible, essentially as one of the concluding production steps in such production lines, for layers of filled and full containers, in particular cans, to be formed after the filling and closing process, and, as appropriate, stacked on one another in order to produce a bundle.

As a rule, all the packaging means contained in such a bundle are exclusively of one and the same product, i.e. such as a beverage of a particular type or sort (such as exclusively juice or a soft drink or beer etc.) and/or one and the same type of taste. Bundles, packaging means, or other packaging units which contain one and the same product are referred to as "unmixed bundles".

In many cases, the market and also the final consumer also require non-unmixed bundles, which are designated hereinafter as "mixed bundles", which then contain, within their outer packaging, packaging units or containers, in each case with different products, such as packaging means with beverages (e.g. soft drinks) of different sorts and/or different tastes (e.g. cola drinks and fruit lemonades, etc.).

In order to form individual layers of packaging means, namely for forming layers, the individual packaging means are first conveyed to a grouping station and aligned there, if appropriate also rotated and/or positioned in such a way that a specific number of individual packaging means or also bundles can be assembled to form a complete layer. A complete layer in this case comprises, for example, a predetermined layer formation or a predetermined layer arrangement, i.e. a complete layer comprises a defined number of rows of individual packaging means, wherein each row comprises a predetermined number of packaging means, and the rows are aligned in a defined manner in relation to one another. In particular, the layer formation or layer arrangement or the size of a complete layer is based, in terms of use, on the bundle size which is desired by the market for a particular filled beverage.

After the layer formation, as a rule the packaging means are conveyed as a single layer, namely as one layer, to a palletising station or palletising machine, and stacked layer by layer on a transport and storage unit, wherein, in order to stabilise the individual layers, intermediate layers of cardboard or board are laid as a plate on the packaging means on top of the respective layer underneath. The possible removal from the pallet takes place takes place in the reverse sequence. The customer demand for "mixed bundles" in particular makes it necessary for a transport and storage unit which has already been assembled from individual layers to be removed again from the pallet, in order for it to be reassembled in accordance with the wishes of the customer with packaging means of different sorts and/or different tastes.

If in this situation intermediate layers of cardboard or board are used between individual layers of the transport and storage unit, it has been shown that the transfer or raising of the layers formed in the grouping station onto the layers assembled in the palletising station on the transport and storage unit is technically elaborate and difficult. The removal from the pallet of the individual layers, with intermediate layers of cardboard or board, from the transport and storage unit onto the grouping station has likewise proved to be elaborate and complex.

Palletising stations or machines therefore have restricted capacities (number of layers palletised per time unit), such that, with the palletising systems used in actual practice they are frequently the factor or bottleneck which restricts the capacity of an entire system in producing stacks of bundles or in general of objects or for palletising objects (palletising system).

The layer formation in particular, but also the layer handling of partially completed or complete layers in a grouping station and downstream machine stations, takes place in a known manner by means of suction devices, which by means of suction units provided take up the packaging means, transfer them, assemble them, and group them, and thereby form the layers. Problematic in this situation, however, is that the suction devices are very susceptible to dirt and fluids which are encountered, with the result that, during the grouping of packaging means, in particular the formation of layers or layer handling, faults often occur, which have a disadvantage effect in particular on the upstream processes of a production line, and lead to interruptions.

Since the packaging means must in each case be raised and then set down again by such known suction devices during the formation of layers, and specifically in a safe and secure manner, and as far as possible with the avoidance of disruptive events, such as accidents or jolting of packaging means, this type of layer formation requires a relatively high amount of time, which has a disadvantageous effect on the production capacity as a whole. Likewise, the known suction devices for layer formation and layer handling have proved in particular to be unsuitable for the situation involving removal from pallets in order to produce mixed bundles in accordance with individual customer wishes.

SUMMARY OF THE INVENTION

Taking this as a basis, the object of the invention is to provide a system for the assembling of layers of packaging means, and for the formation of transport and storage units from at least one of these layers, which overcomes the disadvantages of the systems known from the prior art and improves layer formation and layer handling and is less prone to faults, and, in addition to this, allows for a more rapid and greater capacity assembling of layers of packaging means, as well as the transport and storage units formed from them.

This object is solved by a system for assembling layers from packaging means and for forming transport and storage units from at least one of these layers in accordance with the features of the claims. In addition, to solve the object a method is also described for assembling layers of packaging means and for forming transport and storage units from at least one of these layers in accordance with the features of the claims. The dependent claims relate to particularly advantageous embodiments of the invention.

According to one significant aspect, the invention provides a system for assembling layers from packaging means and for forming transport and storage units from at least one of these layers. The system comprises at least one grouping station with at least one grouping table, comprising a grouping plane, for ordering and grouping the packaging means, and with at least one packaging-means feed for feeding the packaging means to the grouping table in a conveying direction. The packaging-means feed comprises at least two row conveyors for transporting in each case at least one packaging means row, wherein the row conveyors are arranged in the conveying direction on both sides of the grouping table, and feed the packaging means to the grouping table from opposing first and second sides. The grouping station further comprises a transfer unit for the transfer of the packaging means from the respective row conveyors to the grouping table, wherein provision is made on each side for a slide-over buffer region between the respective row conveyors and the grouping table, by means of which the transfer unit slides the packaging means in a respective slide direction from the respective row conveyor onto the grouping table, in order to form a layer from packaging means exhibiting a predetermined layer arrangement. The system further comprises at least one layer stacker, which slides the at least one layer of packaging means formed on the grouping table onto a pallet provided in the layer stack, while retaining the layer arrangement for forming the transport and storage unit.

The system according to the invention provides a perceptibly higher machine availability, saves time, and incurs fewer faults, since, due to the sliding of the packaging means, the layer formation on the grouping table is rapid, reliable, and flexible. Due to the fact that, in the slide-over buffer region, a start can already be made on the formation of a new layer in parallel, while a layer which is still to be produced or has been produced on the grouping table is completed and moves away from the grouping table, there are perceptible gains in time and better utilisation. As a result of this, it is also possible for the packaging means to be fed essentially continuously. Such a continuous packaging means feed advantageously provides a higher capacity than discontinuous systems. In addition to this, the more consistent flow leads to fewer interruptions in the upstream mass flow.

According to one preferred embodiment variant, at least one of the row conveyors or both conveyors is/are provided in the form of a double row conveyor, wherein each double row conveyor is configured so as to transport the packaging means in the conveying direction in two packaging means rows running one behind another. It is of course also possible for the row conveyors to be configured for the transport of three or more rows running next to one another. In particular, if both row conveyors are configured as double row conveyors or, if appropriate, as triple row conveyors, the advantage is achieved of a particularly effective symmetrical packaging means feed, with which in each case double rows or triple rows are delivered to the grouping table, as a result of which an increase in capacity and better continuity of delivery are attained. This also has a particularly favourable effect on the upstream mass flow of the packaging means, since in this way a continuous and uniform removal from the mass flow is ensured.

According to one preferred embodiment, each of the row conveyors, in particular each double row conveyor, comprises a dividing device for dividing or compartmentalising or separating from the packaging means flow a predetermined number, dependent on the particular layer arrangement which is to be formed, of packaging means running behind one another. As a result, the packaging means being transported in the conveying direction can be grouped on the outlet side, at a transfer end of the row conveyor adjacent to the slide-over buffer region, to form a packaging means group, and specifically particularly advantageously in that each of the divided or separated rows contains the precise number of packaging means which are provided for in accordance with the desired layer formation or layer arrangement of the layer which is to be produced per row. The dividing device can be configured in the form of moving contact elements, carrier elements, or stoppers, motor or pneumatically driven. In particular, the corresponding contact elements, carrier elements, or stoppers can be moved in a controlled manner, and, depending on the type of guide means or collectors, can also move or "travel" with the packaging means, for example in sections in the conveying direction with the separated number of packaging means.

For particular preference, the divider device further comprises an alignment means for the row alignment, wherein the divider device and the alignment means interact in such a way that, in the event of there being several packaging means rows running next to one another in the row conveyor, and depending on the particular layer arrangement which is to be formed, the packaging means rows in each packaging means front group can be arranged offset to one another. The leading end of a packaging means group exhibits an offset, and the packaging means of a row stand essentially "at gaps" in relation to the neighbouring row. In the present case this is also understood as a honeycomb-like arrangement of the packaging means, or as a "honeycombing" of the rows. As a result, a particularly space-saving and self-stabilising arrangement of adjacent rows is advantageously produced, which therefore also applies to the entire layer.

According to one preferred embodiment, the transfer unit comprises a transverse carrier element in the form of a guide rail, which is arranged at a distance interval above the grouping plane and extends in relation to the conveying direction transversely over the grouping table. In this situation there are provided at least one first driven slider function unit, mounted such as to be movable at the transverse carrier element and essentially assigned to the first side of the grouping table, as well as a second driven slider function unit, movably mounted at the transverse carrier element and essentially assigned to the second side of the grouping table.

Particular advantages are derived from the fact each slider function unit comprises in each case at least one pair of interacting raising and lowering slide elements, wherein each slide element is driven and, in addition to the raising and lowering movement, can also be moved in the respective slide directions at least in sections along the transverse carrier element, and thereby moved in a horizontal direction by means of a lateral movement transversely over the grouping table. Preferably, in this situation each slide element is driven individually and independently, wherein each slide element can be moved individually and independently both by means of a raising and lowering movement in a vertical direction as well as by means of a lateral travel movement in the horizontal direction.

Preferably, the slide elements can be moved in a controlled manner, wherein the system comprises a control unit, and the movement of the slide elements is controlled individually by means of the control unit. Due to the individual and independent control actuation, the flexibility and/or speed in the layer formation is additionally increased. In particular, the corresponding control routines are deposited in a control unit of the system, preferably a central control unit, which can be called up and applied individually and independently for each slide element depending on the particular application situation.

Particular advantages are also derived from the fact that each of the slide elements comprises its own drive, in particular a motor or pneumatic drive. For example, an individual motor drive is assigned for the lateral travel movement in the horizontal direction along the transverse carrier element, in particular a servomotor, and for the raising and lowering movement in the vertical direction a pneumatic cylinder unit is assigned to each slide element, which preferably comprises two pneumatic cylinders in each case. The horizontal travel movement along the transverse carrier element is advantageously controllable steplessly, such that the slide elements can traverse at least over a certain region of the grouping table, and in this situation can be positioned at will in this transverse movement. The raising and lowering movement is, for example, stepped, such that the slide elements can adopt a defined raised position and a defined lowered position.

For further preference, the slide-over buffer region is formed by a slide-over plate with a flat and smooth upper side, wherein the upper side of the slide-over plate defines a slide plane which essentially coincides with the group plane of the grouping table.

Preferably, for the slide over of the complete layer from the grouping table onto the plate provided in the layer stack guiding and sliding means are provided, wherein the guiding and sliding means comprise in particular guide elements in the form of cages or frames, which are formed such as to secure the layer arrangement during the slide-over, and grip the complete layer securely from above.

The layer stacker preferably comprises a raising fork, which provides the respective plate for accommodating the layer and therefore for forming the transport and storage unit. In particular, the raising fork is configured such as to provide shape-stable plates, such as multiplex plates, and in particular screen printing plates. In particular, the raising fork is configured for the carrying and holding of plates, which preferably comprise a planar upper side, and wherein, on the underside of a basic body of the plates, at least over part of the circumference a holding element is provided, configured in particular as a holding frame projecting from the underside.

The layer stacker preferably also comprises a height positioning device for the exact height positioning of the plate provided, wherein the height positioning device ensures that an upper side of the plate is aligned in the grouping plane of the grouping table, and the upper side of the plate, as a result, forms a slide plane for the sliding up and/or down of the packaging means or the layers respectively, which coincides with the grouping plane in a common plane. As a result, the slide-over of the complete layer onto the plate is made easier. Preferably, in this situation a slide coating is additionally provided on the upper side of the plate.

Advantageously, it is further possible for a centring device to be provided in the region of the layer stacker for the centring and exact horizontal positioning of the plate provided, in order to be able in particular to carry out the precise formation of the transport and storage unit.

The layer stacker is preferably provided with a transfer device for the plates, wherein the transfer device is preferably configured such as to take up a plate from a stack of plates assigned to the layer stacker and place it on the upper side on a layer of a transport and storage unit which is in the process of being formed in the layer stacker. The transfer device is likewise preferably configured, as an alternative or in addition, to take up a plate from a layer of a transport and storage unit located in the layer stacker, and placing it onto a pallet assigned to the layer stacker or a stack of plates assigned to the layer stacker.

In this way, transport and storage units can be formed with the system which consist of several layers stacked above one another, which in each case are stored on a plate. Likewise, it is possible with the system for transport and storage units, consisting of such layers stacked above one another, to be "dismantled", and for the plates used in the transport and storage units, from the respective uppermost layer, to be stacked above one another for the purposes of storage, transport, storage, and reuse. Accordingly, the system is configured in particular to be used both for palletising as well as for de-palletising.

The invention also relates to a method for assembling layers of packaging means and for forming transport and storage units from at least one of these layers, wherein packaging means are arranged and grouped in a grouping station of a system, on a grouping table comprising a grouping plane. The packaging means are conveyed by means of a packaging means feed in a conveying device to the grouping table, wherein the packaging means feed comprises in each case at least two row conveyors arranged on both sides of the grouping table, for the transporting in each case of at least one row of packaging means, and the packaging means are fed to the grouping table from opposing first and second sides. The packaging means are slid over onto the grouping table by means of a transfer unit provided, from the respective row conveyors, in each case over slide-over buffer regions provided between the row conveyors and the grouping table, in order to form the layer of packaging means exhibiting a predetermined layer arrangement. The complete layer of packaging means is slid over onto a plate provided in a layer stack, while maintaining the layer arrangement for forming the transport and storage unit.

Preferably, the packaging means of a respective layer which is to be formed are slid over from the row conveyors onto the grouping table successively as group by group in several transfer steps, and specifically in a controlled manner. The layer formation can take place in different patterns, namely with widely differing sub-groupings of packaging means, different packet formations, etc., such that, as a result, a wide range of variants and great flexibility are available for the layer formation.

According to one preferred embodiment variant, the packaging means are slid over from the row conveyors onto the grouping table by means of several slide elements, individually actuated and driven individually and independently. Due to the individual and independent actuation, as well as due to the individual and independent drive of the several slide elements, the flexibility and/or speed of the layer formation is additionally increased. In particular, the corresponding control routines are deposited in a control unit of the system, preferably a central control unit, which can then be called up and used individually and independently for each slide element, depending on the particular application.

Preferably, the packaging means are conveyed to the grouping table symmetrically, wherein the packaging means are preferably conveyed on each side as a double row. Other conveying forms are of course possible, such as triple rows.

According to a preferred embodiment variant, the packaging means are pre-grouped at a transfer end of the row conveyors, facing the grouping table, to form a packaging means group.

Likewise preferably, as early as during the production of a first layer on the grouping table, the packaging means for a further new layer are slid over into the respective slide-over buffer regions and preferably there assembled to form part layers. This allows, in addition to significant time saving, improved machine capacity utilisation.

The expression "essentially" or "approximately" signifies in the meaning of the invention deviations from the exact value in each case by +/−10%, preferably by +/15%, and/or deviations in the form of changes which are not of significance for the function.

Further embodiments, advantages, and possible applications of the invention also derive from the following description of exemplary embodiments and from the figures. In this context, all the features described and/or represented in the FIGS. are in principle the object of the invention, individually or in any desired combination, regardless of their combination in the claims or reference to them. The contents of the claims are also made constituent parts of the description.

BRIEF DESCRIPTION OF THE FIGURES

The invention is described in greater detail hereinafter on the basis of the figures in relation to exemplary embodiments. The figures show.

DETAILED DESCRIPTION OF THE INVENTION

Identical reference numbers are used in the figures for elements of the invention which are the same or have the same effect. Furthermore, for the sake of easier overview, only reference numbers are shown in the individual figures which are required for the description of the respective figure. The invention is also represented in the figures only in a schematic view for the explanation of the mode of operation. In particular, the representations in the figures serve only to explain the basic principle of the invention. For reasons of easier overview, the representation of all the constituent parts of the device has been avoided.

The system designated in the figures in general by 1 serves to assemble layers LA of packaging means 2, and to form transport and storage units 100 from at least one of these layers LA. In particular, the system 1 described and represented in the figures is an arrangement or a system of devices or machines which are suitable for the packing and/or palletising of packaging means 2 or to produce units or bundles which are capable of storage and transport. In the widest sense, therefore, the system 1 can also be understood as a packaging and/or palletising system.

The exemplary system 1 is especially well-suited for the handling and processing of packaging means 2 formed as liquid containers, in particular for beverage containers, such as beverage cans, such that the system 1 can preferably be used in the beverage industry, and can, for example, also be a part of a beverage filling system. In particular, it is possible with the system 1 described here for beverage cans 2 which are already filled or are to be filled to be assembled to form layers LA, and, from these layers LA of filled beverage cans, finally for transport and storage units 100 to be formed. In the meaning of the present invention, the filled beverage cans are also designated as full cans, such that the assembling of layers LA and the formation of transport and storage units 100 can also be understood in this case as a full can palletising process.

Figure 1:
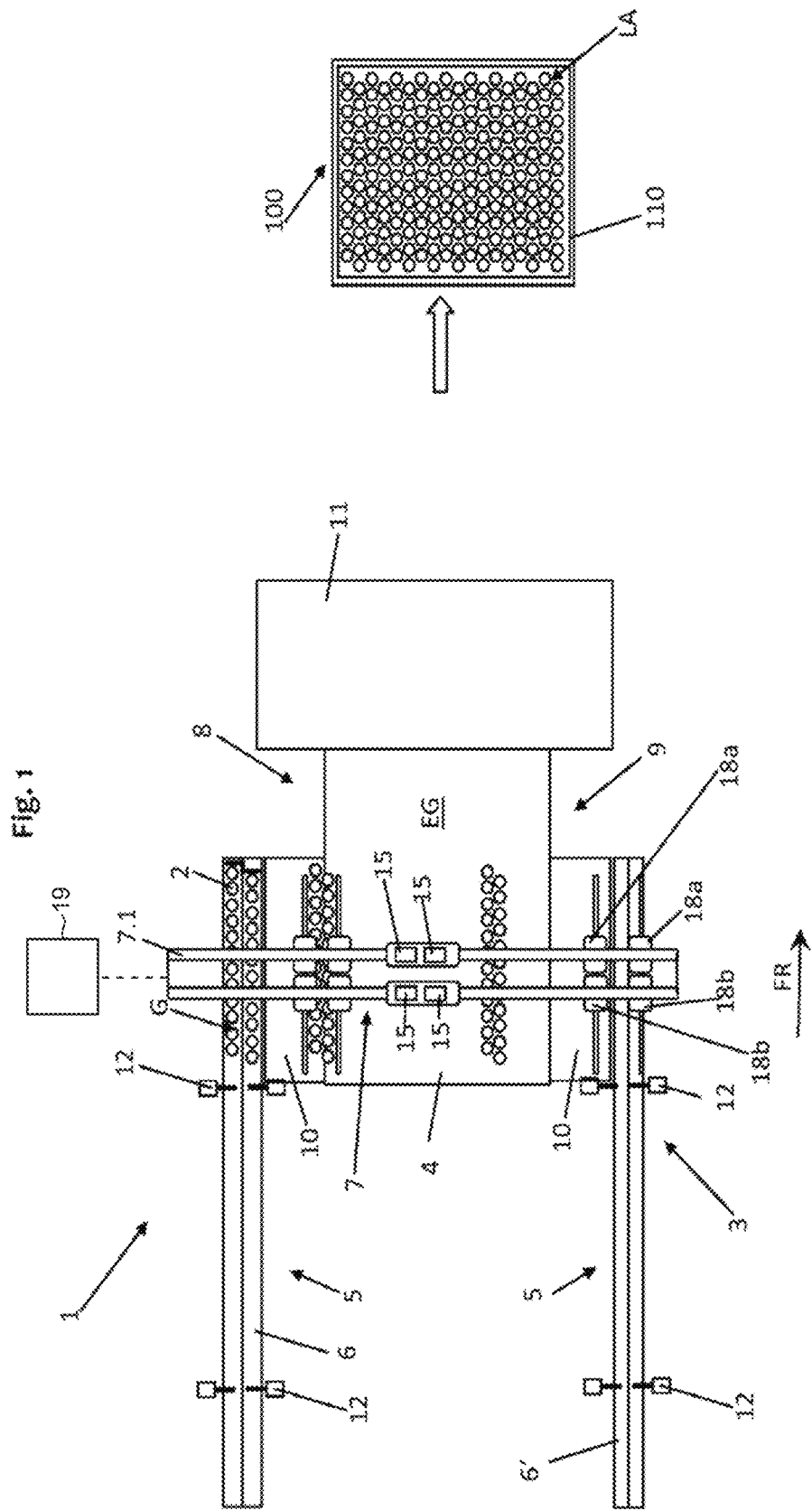
FIG. 1 Highly simplified and only sketched by way of example, in a view from above, an embodiment variant of a system for assembling layers of packaging means and for forming transport and storage units from at least one of these layers according to the invention, and a transport and storage unit formed in the system, FIG. 2 a rough schematic and highly simplified view of an exemplary embodiment of the system according to the invention, wherein the slide function units provided for the sliding of the packaging means are represented in one of many possible position settings, FIG. 3 a view of the system as in FIG. 2, wherein the slide function units provided for the sliding of the packaging means are represented in a further possible position setting, and FIG. 4 on the basis of an exemplary schematic diagram, a possible variant of step sequences for the layer formation.

Shown in a rough schematic and highly simplified form in FIG. 1 is an exemplary embodiment of a system 1, sketched in a view from above. The system 1 comprises a grouping station 3 and a layer stacker 11 downstream of the grouping station 3 in the conveying direction FR. In the grouping station 3 the packaging means 2 which conveyed are essentially assembled to the desired layers LA and transferred to the layer stacker 11, where the assembled layers LA are pushed onto specially provided plates 110, provided in the layer stacker 11, with the formation of the transport and storage unit 100.

The grouping station 3 of the system 1 represented by way of example in FIG. 1 comprises a grouping table 4, which defines with its upper side and with its upper surface a grouping plane EG, and, with at least one part section of this upper side, forms a preparation place or collection zone for the ordering and grouping of the packaging means 2. The grouping table 4 is configured in the example represented as being essentially rectangular, and extends in its length along the conveying direction FR, wherein opposing longitudinal sides oriented in the conveying direction FR form a first and second side 8, 9 of the grouping table 4.

The grouping station 3 further comprises a packaging means delivery device 5 for delivering the packaging means 2 to the grouping table 4, wherein the packaging means delivery device 5, in the example represented in FIG. 1 comprises two double row conveyors 6, 6' for transporting in each case two packaging means rows running next to one another. The double row conveyors 6, 6' are arranged in the conveying direction FR on both sides of the grouping table 4, i.e. the first double row conveyor 6 runs on the first side 8 of the grouping table 4 and the second double row conveyor 6' runs on the second side 9 of the grouping table 4.

As a result of this two-side arrangement of the double row conveyors 6, 6', the delivery of the packaging means 2 to the grouping table 4 from two opposing sides 8, 9 takes place in a symmetrical manner. In the exemplary embodiment represented here, the two double row conveyors 6, 6' are arranged parallel to one another, as well as parallel to the first and second sides 8, 9 of the grouping table 4, and are oriented along their length in the conveying direction FR. Not represented in FIG. 1, on the inlet side, a packaging means inlet is provided, at the inlet end of the double row conveyors 6, 6', facing away from the grouping table 4, which delivers the packaging means 2 in a mass flow, namely in an unordered manner in bulk to the double row conveyors 6, 6'. From the mass flow of the packaging means inlet, the packaging means 2 go over, in a known manner, at a transfer point on to the double row conveyors 6, 6', into a line or row transport system.

The double row conveyors 6, 6' which transport the packaging means 2 standing upright, in particular the filled beverage cans, form for this upright transport of the beverage cans 2 a transport plane, which essentially lies at the same height as the group plane EG of the grouping table 4, and coincides with this in a common plane. The double row conveyors 6, 6', extending from their inlet end as far as a transfer end arranged on the outlet side, are essentially arranged upstream of the grouping table 4 in the conveying direction FR, but overlap in sections, related to the conveying direction FR, with the region of their transfer end, with the grouping table 4.

Each double row conveyor 6, 6' comprises a dividing device 12 for compartmentalising or separating a predetermined number of the packaging means 2 running behind one another in a row, the number being dependent on the respective layer arrangement which is to be formed, from the packaging means flow or from the respective packaging means row, such that the packaging means 2 being transported in the conveying direction FR are grouped by means of the double row conveyors 6, 6' on the outlet side at the transfer end, to form a packaging means preliminary group G. Also provided at the dividing device 12 is an alignment means for aligning the row, which arranges the two packaging means rows in each packaging means preliminary group G offset to one another as a dependency of the layer arrangement which is to be formed, such that the leading end of the packaging means preliminary group G is formed in a stepped manner or with an offset, and the packaging means 2 of a row stand essentially at gaps in relation to the packaging means 2 of the adjacent row. In the regions of the transfer ends of the respective double row conveyors 6, 6', arranged overlapping with the grouping table 4, the pregrouped packaging means groups G therefore stand ready for the slide over onto the grouping table 4.

Provided in these overlapping regions, on each side 8, 9 of the grouping table 4, between the respective double row conveyor 6, 6' and the grouping table 4, is in each case a slide-over buffer region 10, over which the packaging means 2, in particular the packaging means groups G, are slid from the respective transfer end of the double row conveyors 6, 6' in a respective slide direction SR1, SR2 onto the grouping table 4. Preferably, the slide-over buffer region 10 is formed by a slide-over plate with a flat and smooth upper side, wherein the upper side of the slide-over plate 10 defines a slide plane which essentially coincides with the grouping plane EG and with the transport plane. The respective width of the slide-over buffer regions 10 preferably amounts to at least approximately four times the diameter of the packaging means 2 which are to be processed, such that the slide-over buffer region 10 can encompass, for example, two of the packaging means groups G, each consisting of a double row.

Figure 2:
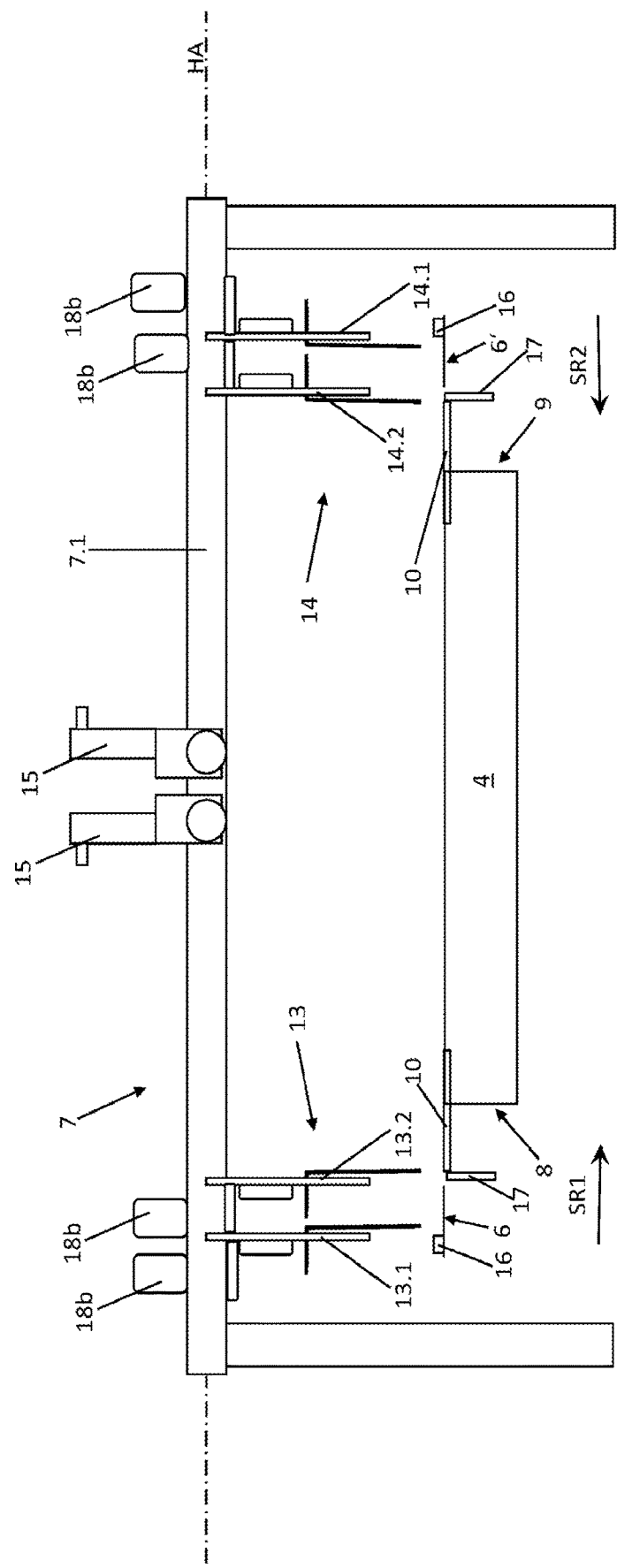

For the slide-over function, and for the transfer of the packaging means 2 or packaging means groups G from the respective row conveyors 6, 6' to the grouping table 4, the grouping station further comprises a transfer unit 7, the structure and function of which are explained in greater detail in connection with FIGS. 2 and 3. FIGS. 2 and 3 show in this situation a rough schematic and highly simplified view of an exemplary embodiment of the system 1, wherein the transfer unit 7 provided for the sliding of the packaging means 2 can be seen. As has already been explained, the transfer unit 7 slides the packaging means 2 from the respective row conveyor 6, 6' in a respective sliding direction SR1, SR2 onto the grouping table 4, in order to form there the layer LA from the packaging means 2, wherein each layer LA is produced in accordance with a desired predetermined layer arrangement or in accordance with a desired predetermined layer pattern by way of the transfer unit 7.

The transfer unit 7 comprises a transverse carrier element 7.1, in the form of a guide rail secured to parts of the machine frame, with a main axis HA, which, seen in a vertical direction, is arranged above the grouping table 4, located at a specified higher height level from the grouping plane EG, in such a way that the main axis HA runs essentially parallel to the grouping plane EG. The transverse carrying element 7.1 extends in relation to the conveying direction FR, which in the representation in FIGS. 2 and 3 run into the paper plane and is not identifiable, transversely over the grouping table 4 and the slide-over plates 10, connecting with this on both sides, and the respective row conveyor 6, 6', adjacent to the slide-over plates 10, wherein the main axis HA of the transverse carrier element 7.1 is oriented essentially perpendicular to the conveying direction FR.

Provided at the transverse carrier element 7.1 are slide function units 13, 14, mounted such as to be movable and driven by motor and pneumatic means. In this situation, essentially the first slide function unit 13 is assigned to the first side 8 of the grouping table 4, and the second slide function unit 14 is assigned to the second side 9 of the grouping table 4. Each slide function unit 13, 14, comprises in each case a pair of interacting raising and lowering slide elements 13.1, 13.2, 14.1, 14.2. For example, the respective first slide elements 13.1, 14.1 take effect on each side 8, 9 as sliding or pressing elements, which slide or press the packaging means 2 or the packaging means groups G, or larger packets formed in turn from several packaging means groups G, in the respective slide direction SR1, SR2. The respective second slide elements 13.2, 14.2 on each side 8, 9 take effect in this situation as stops or pick-ups or counter-holders, which hold or guide the corresponding packaging means groups G or the packets moved by the slide elements 13.1, 14.1 in the slide direction SR1, SR2.

Each slide element 13.1, 13.2, 14.1, 14.2 is driven in this situation individually and independently, and specifically both for the raising and lowering movement in the vertical direction as well as for the travel movement in the horizontal direction. Each slide element 13.1, 13.2, 14.1, 14.2 can therefore be moved at least in sections along the transverse carrier element 7.1 in the direction of the main axis HA, and specifically in the respective slide directions 13.1, 13.2, 14.1, 14.2 in each case over a specific section, preferably over at least a quarter or at least a third or at least the half of the length of the transverse carrier element 7.1, by means of a lateral travel movement to-and-fro in the horizontal direction, in particular steplessly.

The slide elements 13.1, 13.2, 14.1, 14.2 are moved in this situation in a controlled manner, wherein the system 1 comprises a control unit 19, and the movement of the slide elements 13.1, 13.2, 14.1, 14.2 is individually controlled by means of this control unit 19. In this situation, each slide element 13.1, 13.2, 14.1, 14.2 can be controlled individually and independently, such that both the vertical raising and lowering movement as well as the horizontal lateral travel movement can take place individually and independently at each slide element 13.1, 13.2, 14.1, 14.2. In the example shown, each slide element 13.1, 13.2, 14.1, 14.2 comprises an individual motor drive 15, in particular a servomotor, which is connected by respective toothed belts to the slide elements 13.1, 13.2, 14.1, 14.2. Shown in FIG. 1 are the four servomotors 15, individually assigned to the slide elements 13.1, 13.2, 14.1, 14.2. In FIGS. 2 and 3 only two are to be seen, the other two being concealed from view. In the examples shown, each slide element 13.1, 13.2, 14.1, 14.2 likewise comprises its own independent pneumatic drive for the vertical raising and lowering movement, and specifically in the form of a respective pneumatic cylinder unit, consisting in each case of two cylinders 18*a*, 18*b*.

In the representation in FIG. 2, all the slide elements 13.1, 13.2, 14.1, 14.2 are in a lowered position, in which the packaging means 2 or the packaging means groups G or packets can be taken into engagement. Likewise, the slide elements 13.1, 13.2 of the first slide function unit 13 are located in the region above the double row conveyor 6, and those slide elements 14.1, 14.2 of the second slide function unit 14 are located in the region above the double row conveyor 6'. In this position, each slide function unit 13, 14 can "grip" and slide a packaging means preliminary group G at the respective transfer end of the double row conveyor 6, 6'.

In the representation in FIG. 3, the slide elements 13.2 and 14.2 are in a raised position, in which they are located above the packaging means 2 or the packaging means groups G or packets, and in which, for example, return travel to the respective sides 8, 9 or double row conveyors 6, 6' can take place unhindered during the layer formation, even if the layer LA of packaging means 2 which is being formed is located on the grouping table 4. The slide elements 13.2, 14.2 are likewise located in the region of the centre of the collection zone of the grouping table 4.

A guide means 16, serving as an outer delimitation and in the form of an outer railing or a guide strip is provided for the packaging means guide 5 laterally at the double row conveyors 6, 6', which interacts with an internal railing 17 which can be raised or lowered, in order to guide the rows of packaging means 2 during transport. During the formation of the layers LA on the grouping table 4, in order for the layer LA which is produced in each case on the grouping table 4 to be stabilised with the maintaining of the layer pattern or the layer arrangement, further front and rear layer guides are provided, which in each case can be raised or lowered, which form a delimitation to the collection zone on the grouping table 4, and which extend essentially perpendicular to the conveying direction FR transversely over the grouping table 4. In order to slide the packaging means groups G from the double row conveyors 6, 6' onto the grouping table 4, the internal railings 17, which can be raised and lowered, are lowered, as is represented in FIGS. 2 and 3. By way of example, during the pre-grouping of a packaging means preliminary group G at the transfer end of the double row conveyor 6, 6', the internal railings 17 are in a raised position, in order to form a lateral stop, and to prevent a premature packaging means movement in the slide direction S1, S2. The lowering and raising of the internal railings 17 and layer guides also takes place in a controlled manner.

The function and mode of operation of the slide function units 13, 14 in the formation of layers can be explained in greater detail hereinafter by reference to FIG. 4 on the basis of a special example, wherein each of the sketches a) to l) of FIG. 4 represent a highly simplified view from above onto the grouping table 4, the slide-over plate 10, and the double row conveyor 6, 6', of which, for reasons of easier overview, only sketch a) has been provided with reference numbers. By analogy, however, the same reference numbers also apply to the other sketches.

Sketches a) to l) of FIG. 4 represent individual steps of the layer formation, wherein, for reasons of easier overview, each row sketched of a packaging means preliminary group G, of a packet, or of a layer LA contains in each case only four packaging means 2. It is understood that the rows of a layer LA do as a rule comprise more than four packaging means, and exhibit, for example, 10, 11, or more packaging means.

In sketch a), which represents the initial state in the formation of a new layer LA, in each case a double row of packaging means 2 has already run in at the transfer end of the double row conveyor 6, 6', and has already grouped to form a packaging means preliminary group G.

In this position, the slide function units 13, 14 move left and right to the packaging means preliminary group G, the respective slide elements 13.1, 13.2 "grip around" the corresponding packaging means preliminary group G on the double row conveyor 6, and the respective slide elements 14.1, 14.2 "grip around" the corresponding packaging means preliminary group G on the double row conveyor 6'. As soon as the slide elements 13.1, 13.2 and 14.1, 14.2 are securely in position, the internal railings 17 are lowered, the layer guides are brought into the blocking position, and each packaging means preliminary group G is pushed onto the slide-over buffer region 10 (sketch b)), while the next packaging means preliminary groups G are already being formed and stand ready at the transfer ends of the double row conveyors 6, 6' (sketch c)). Next, the slide elements 13.1, 13.2 and 14.1, 14.2 guide the packaging means preliminary group G standing ready at the double row conveyors 6, 6' as far as shortly before the contact with the respective packaging means preliminary group G on the slide-over buffer region 10, and the respective slide elements 13.2, 14.2, which serve as "collectors", are raised and move inwards in the direction towards the middle of the grouping table 4, in order now to form a packet consisting of two packaging means preliminary groups G and slide further in the direction of the collection zone (sketch d)).

With approximately this sequence, the packets are constantly enlarged by new packaging means preliminary groups G, consisting in each case of two rows, and slid further in the direction of the collection zone (sketches e) to g)). Sketch h) shows a situation in which the packet which is "growing" at the right side of the sketch (which corresponds to the second side 9 of the grouping table 4), and which consists of eight double rows, has already moved into the centre of the collection zone of the grouping table 4, while (as shown in sketch i)) on the left side a further double row is being added, and, on the right side, the first packaging means preliminary group G, belonging to the next layer LA, is already "intermediate buffered" on the slide-over buffer region 10. In the representation in the sketches j) and k), the first layer LA is completed in the middle in the collection zone of the grouping table 4, while the packaging means preliminary groups G for the next layer are being slid over successively onto the slide-over buffer regions 10.

The completed layer LA runs out, guided by the corresponding layer guides (sketch l)), and specifically in the conveying direction FR to the layer stacker 11 downstream of the grouping station 3. During this period, too, the packets required for the next layer LA can already be being prepared and formed on the slide-over buffer regions 10, as a result of which both the evident saving of time and, in particular, an improved interference-free sequence in layer formation can be achieved. Since, as a result of this, the delivery and transport of the packaging means 2 runs essentially continuously, in particular the removal of the packaging means 2 out of the upstream mass flow is so regular that interruptions can be avoided.

The layer LA running out in the direction of the layer stacker 11 goes over to the layer stacker 11 with the layer order arrangement being retained, and is slid over here, in order to form the transport and storage unit 100, onto a plate 110 prepared in the layer stacker 11. This likewise takes place in a guided manner and with the retaining of the layer order arrangement and the layer pattern, wherein the sliding movement onto the plate 110 is carried out, for example, by a sliding and guiding unit in the form of a cage or frame. By means of centring units in the system 1, for example in the region of the layer stacker 11, the required position of the layer LA can be monitored and corrected.

Provided in the layer stacker 11 is a raising fork, which provides for each completed layer LA a respective plate 110 for receiving the layer LA. The raising fork is configured in this situation in such a way that it provides the plate 110 which is to be loaded at the corresponding height, namely preferably at the height of the grouping plane EG, such that a stepless slide over onto the plate 110 is possible.

A multilayer transport and storage unit 100, consisting of a plurality of layers is formed, for example, by the raising fork lowering the transport and storage unit 100, and a transfer device, likewise provided in the system, places a new plate 110 on top of the layer LA. By means of a height positioning device, it is ensured that the upper side of the "new" plate 110 lying on the layer is now aligned in the group plate EG of the grouping table 4 in such a way that a new layer LA, assembled in the grouping station 3, can be slid on.

The invention has been described heretofore on the basis of exemplary embodiments. It is understood that a large number of modifications or derivations are possible without thereby departing from the scope of protection of the invention defined by the claims. The contents of the claims are also declared to be the object of the description.

REFERENCE NUMBER LIST

1 System
2 Packaging means
3 Grouping station
4 Grouping table
5 Packaging means delivery device
6, 6' Row conveyor
7 Transfer unit
7.1 Transverse carrier element
8 First side
9 Second side
10 Slide-over buffer range
11 Layer stacker
12 Dividing device
13 First slide function unit
13.1, 13.2 Slide elements
14 Second slide function unit
14.1, 14.2 Slide elements
15 Motor drive
16 Guide means
17 Internal railings
18a, 18b Pneumatic cylinder
100 Transport and storage unit
110 Plate
EG Grouping plane
FR Conveying device
HA Main axis
LA Layers
SR1, SR2 Sliding direction

The invention claimed is:

1. A system for assembling layers of packaging means and for forming transport and storage units from at least one of the layers, the system comprising:

a grouping station for ordering and grouping the packaging means, said grouping station having at least one grouping table with a grouping plane;

a packaging means delivery device for delivering the packaging means to said grouping table in a conveying direction, said packaging means delivery device having at least two row conveyors, each for transporting at least one row of packaging means;

said row conveyors being arranged on both sides of said grouping table, in the conveying direction, and being configured to deliver the packaging means to said grouping table from mutually opposite first and second sides;

said grouping station further having a transfer unit for transferring the packaging means from the respective said row conveyors to said grouping table, with a slide-over buffer region being formed on each of said first and second sides between the respective said row conveyors and said grouping table, over which said transfer unit slides the packaging means in a slide direction from the respective said row conveyor onto said grouping table, to thereby form a layer of packaging means in a predetermined layer arrangement;

said transfer unit having at least one first driven slide function unit and a second driven slide function unit, each slide function unit having at least one pair slide elements, and each of said slide elements being driven individually and independently, and each of said slide elements being individually and independently movable by a raising and lowering movement in a vertical direction and also by a lateral travel movement in a horizontal direction; and a layer stacker configured to slide the layer of packaging means formed on said grouping table, while retaining the predetermined layer arrangement, onto a plate provided at layer stacker in order to form a respective transport and storage unit.

2. The system according to claim 1, wherein at least one of said row conveyors is a double row conveyor configured to transport the packaging means in two packaging means rows running next to one another in the conveying direction.

3. The system according to claim 1, wherein each of said row conveyors is configured to group the packaging means being transported in the conveying direction at an outlet side, at a transfer end adjacent said slide-over buffer region, to form a packaging means group, and wherein said row conveyor includes a dividing device for dividing a predetermined number of the packaging means, running one behind another, from the packaging means flow, the number being dependent on the respective layer arrangement to be formed.

4. The system according to claim 3, further comprising at least one alignment device for aligning rows, wherein said dividing device and said alignment device are configured, with a plurality of packaging means running next to one another in said row conveyor, to arrange the packaging means rows in each preliminary group of packaging means offset to one another, depending on the layer arrangement to be formed.

5. The system according to claim 1, wherein said transfer unit comprises a transverse carrier element, being a guide rail arranged above a grouping plane of said grouping table, at a spacing distance therefrom and extending relative to the conveying direction transversely over said grouping table, and said at least one first driven slide function unit is movably mounted at said transverse carrier element, and said second driven slide function unit is movably mounted at said transverse carrier element.

6. The system according to claim 5, wherein each pair of slide elements are interacting raising and lowering slide elements, and each raising and lowering slide element is driven and is movable in respective sliding directions along said transverse carrier element.

7. The system according to claim 6, wherein said slide elements are mounted for individual control and for individually controlled movement, and further comprising a control unit for individually controlling a movement of individual said slide elements.

8. The system according to claim 6, wherein each of said slide elements comprises at least one of an individual motor drive or a pneumatic drive.

9. The system according to claim 1, wherein said slide-over buffer region comprises a slide-over plate with a flat and smooth surface, and wherein an upper side of said slide-over plate defines a slide plane substantially coplanar with a grouping plane of said grouping table.

10. A method for assembling layers of packaging means and for forming transport and storage units from at least one of the layers, the method comprising:
    in a grouping station, arranging and grouping packaging means on a grouping table formed with a grouping plane;
    conveying the packaging means by a packaging means delivery device in a conveying direction to the grouping table, the packaging means delivery device having two row conveyors arranged on both sides of the grouping table and each of the row conveyors being configured to transport at least one row of packaging means;
    providing a transfer unit with at least one first driven slide function unit and a second driven slide function unit, each slide function unit having at least one pair slide elements, and each of the slide elements being driven individually and independently, and each of said slide elements being individually and independently movable by a raising and lowering movement in a vertical direction and also by a lateral travel movement in a horizontal direction;
    conveying the packaging means to the grouping table from opposing first and second sides by sliding the packaging means with the transfer unit from the respective row conveyors, over slide-over buffer regions between the row conveyors and the grouping table, onto the grouping table in order to form a layer of packaging means in a predetermined layer arrangement; and
    sliding a completed layer of packaging means onto a plate provided in a layer stacker, while retaining the predetermined layer arrangement, in order to form the transport and storage unit.

11. The method according to claim 10, which comprises sliding over the packaging means of a respective layer that is to be formed successively and in groups, in a plurality of controlled transfer steps, from the row conveyors onto the grouping table.

12. The method according to claim 11, which comprises sliding over the packaging means from the row conveyors onto the grouping table by a plurality of individually and independently actuated and individually and independently driven slide elements.

13. The method according to claim 10, which comprises delivering the packaging means to the grouping table symmetrically, with the packaging means being delivered on each side as a double row.

14. The method according to claim 13, which comprises preliminarily grouping the packaging means at a transfer end of the row conveyors, facing the grouping table, to form a packaging means preliminary group.

15. The method according to claim 10, which comprises, prior to a completion of a complete layer on the grouping table, sliding further packaging means for a further new layer into the respective slide-over buffer regions and optionally assembling the further packaging means to form part layers.

* * * * *